United States Patent
Walsh et al.

(10) Patent No.: US 9,050,930 B2
(45) Date of Patent: Jun. 9, 2015

(54) COLLISION AVOIDANCE SIGNAL

(75) Inventors: James D. Walsh, Rochester, NY (US); James Dunst, Victor, NY (US)

(73) Assignee: Xerox Corporation, Norwalk, CO (US)

( * ) Notice: Subject to any disclaimer, the term of this patent is extended or adjusted under 35 U.S.C. 154(b) by 160 days.

(21) Appl. No.: 13/273,557

(22) Filed: Oct. 14, 2011

(65) Prior Publication Data

US 2013/0093582 A1 Apr. 18, 2013

(51) Int. Cl.
| | |
|---|---|
| B60Q 1/00 | (2006.01) |
| B60Q 1/52 | (2006.01) |
| B60W 30/095 | (2012.01) |
| B60W 30/18 | (2012.01) |

(52) U.S. Cl.
CPC .............. B60Q 1/525 (2013.01); *B60W 30/0956* (2013.01); *B60W 30/18054* (2013.01); *B60W 2550/308* (2013.01)

(58) Field of Classification Search
CPC ............ B60Q 1/302; B60Q 1/52; B60Q 1/44; B60Q 1/444; B60Q 1/447; B60Q 1/26; B60Q 1/46
See application file for complete search history.

(56) References Cited

U.S. PATENT DOCUMENTS

| | | | |
|---|---|---|---|
| 5,684,474 A * | 11/1997 | Gilon et al. ................... 340/903 |
| 5,760,708 A * | 6/1998 | Seith .............................. 340/903 |
| 5,838,228 A * | 11/1998 | Clark ............................. 340/436 |
| 6,351,211 B1 * | 2/2002 | Bussard ........................ 340/468 |
| 7,365,641 B2 * | 4/2008 | Nou .............................. 340/436 |
| 7,378,948 B2 * | 5/2008 | Somuah ........................ 340/436 |
| 2007/0100552 A1 | 5/2007 | Thorne |
| 2009/0045928 A1 * | 2/2009 | Rao et al. ...................... 340/435 |
| 2009/0192710 A1 | 7/2009 | Eidehall et al. |
| 2009/0210157 A1 | 8/2009 | Lee |
| 2010/0063736 A1 | 3/2010 | Hoetzer |
| 2010/0191418 A1 | 7/2010 | Mimeault et al. |
| 2011/0196569 A1 | 8/2011 | Lee et al. |

* cited by examiner

*Primary Examiner* — Curtis King
(74) *Attorney, Agent, or Firm* — Kermit D. Lopez; Luis M. Ortiz; Ortiz & Lopez, PLLC

(57) ABSTRACT

A vehicle collision avoidance signaling method and system are disclosed. The collision signal captures the attention of a distracted driver for the driver to brake appropriately. The vehicle collision warning signal and lighting system automatically alerts an approaching driver of a stopped or slowed vehicle via a strobe or flashing lighting system. An onboard driver is also alerted to the approaching vehicle. Rear vehicle sensors can sense vehicles approaching from the rear and determine the distance, velocity, and the deceleration of the approaching vehicle. A processor processes the signal and integrates with the onboard vehicle's speedometer signal and braking system. If the approaching car's rate of closure is determined to be extreme compared to the vehicle's location, a bright strobe signal along with the brake signal would be automatically given The intensity of the strobe warning can be determined by the rate and distance at which a vehicle is approaching.

14 Claims, 5 Drawing Sheets

COLLISION AVOIDANCE SIGNAL

TECHNICAL FIELD

The disclosed embodiments generally relate to data-processing systems and methods. The disclosed embodiments further relate to a vehicle collision avoidance signal. The disclosed embodiments also relate to brake and strobe alert signals.

BACKGROUND OF THE INVENTION

A driver sits at a red light, patiently waiting for her turn to pass through the intersection. While looking back through her rear view mirror, she notices a car travelling at a high rate of speed. She wonders whether the car will stop in time to avoid hitting her car. Unable to move into another lane, she hopes that the other driver notices that she is stopped. The car maintains its speed and does not appear to be slowing down. No real options exist to warn the other driver that she is stopped in front of him. The other driver does not have enough time to slow down when he realizes that she is stopped and collides with her car.

This common scenario can be averted with an automatic warning system that alerts an approaching driver of a stopped vehicle. Vehicles often travel at separation distances that are too short to allow sufficient braking time should the forward traffic suddenly slow. Whether stopped at a red light, stopped in slowed traffic, or slowing down at a car accident site, a warning system could alert drivers to avert rear-end collisions. A driver of a trailing vehicle will be better informed of speed reductions in the forward traffic flow and the likelihood of a rear-end collision will be reduced. Views of roadways are often obstructed with a higher percentage of large vehicles on the road, thus reducing the time a driver has to react to sudden reductions in traffic speed. Drivers are often distracted with additional activities within their vehicle.

Therefore, a need exists for an improved vehicle collision warning signal to automatically alert drivers of changes in vehicle speeds or stopped vehicles. The warning will lead to safer road ways, reduced number of rear-end collisions, reduced physical damage to vehicles and vehicle occupants, and reduced vehicle insurance costs.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide for a vehicle collision avoidance signal to capture a driver's attention.

It is another aspect of the disclosed embodiments to provide for triggering braking signals without a driver's intervention.

It is a further aspect of the disclosed embodiments to provide a rear collision sensor system to collect and process information regarding nearby vehicle's speed and position.

The above and other aspects can be achieved as is now described. A vehicle collision avoidance signaling method and system are disclosed. A collision signal can capture the attention of a distracted driver to allow the driver time to brake appropriately. The vehicle collision warning signal and lighting system automatically alerts an approaching driver of a stopped or slowed vehicle via an illuminating steady signal, a flashing light system, or a high intensity strobe. An onboard driver is also alerted to the approaching vehicle. Rear vehicle sensors can sense vehicles approaching from the rear and determine the distance, velocity, and the deceleration of the approaching vehicle. A processor processes the signal and integrates the signal with the onboard vehicle's speedometer signal and braking system. If the approaching car's rate of closure is determined to be extreme compared to the vehicle's location, a warning signal of an appropriate level would be automatically given. The intensity of the warning would be determined by the rate and distance at which a vehicle is approaching. The distance at which a warning signal would be given is also determined by the rate and position of the approaching vehicle.

A method is disclosed that comprises the steps of: collecting vehicle data for a first vehicle approaching a second vehicle; analyzing the vehicle data to determine if the first vehicle can stop before colliding with the second vehicle; and issuing an automatic strobe light warning of varying intensity to alert a driver of the first vehicle if the analyzed data indicates that the first vehicle is approaching the second vehicle at a high rate of speed. The method can further comprise the step of sensing the first vehicle approaching a slowed or stopped second vehicle via a rear vehicle sensor associated with the second vehicle. The vehicle data can comprise at least one distance of said first vehicle from said second vehicle, velocity of said first vehicle, deceleration of said first vehicle, velocity of said second vehicle, and deceleration of said second vehicle.

The method can further comprise the step of activating the automatic strobe light warning and an automatic reactive system to control operation of the second vehicle if the analyzed data indicates that the first vehicle is approaching the second vehicle at a high rate of speed or preparing to change lanes in close proximity to the second vehicle. The automatic strobe light warning can operate independently of a driver of the second vehicle. The method can further comprise the step of: varying an intensity of the automatic strobe signal when a driver of the second vehicle depresses a brake pedal of the second vehicle and varying an intensity of the automatic strobe light signal when the first vehicle approaches the second vehicle at an increased rate of speed and shorter distance. The method can further comprise the step of: issuing an additional warning with the automatic strobe light signal, the additional warning comprising at least one of actuating a horn of the second vehicle, controlling a brake of the second vehicle, controlling a steering of the second vehicle, and adjusting the speed of the second vehicle.

A system is disclosed that comprises: a processor; a data bus coupled to the processor; and a computer-usable tangible storage device storing computer program code, the computer program code comprising program instructions executable by the processor, the program instructions comprising: program instructions to collect vehicle data for a first vehicle approaching a second vehicle; program instructions to analyze the vehicle data to determine if the first vehicle can stop before colliding with the second vehicle; and program instructions to issue an automatic strobe light warning of varying intensity to alert a driver of the first vehicle if the analyzed data indicates that the first vehicle is approaching the second vehicle at a high rate of speed. The program instructions can further comprise of program instructions to sense the first vehicle approaching a slowed or stopped second vehicle via a rear vehicle sensor associated with the second vehicle.

The vehicle data can comprise at least one distance of said first vehicle from said second vehicle, velocity of said first vehicle, deceleration of said first vehicle, velocity of said second vehicle, and deceleration of said second vehicle. The program instructions can further comprise: program instructions to activate the automatic strobe light warning and an automatic reactive system to control operation of the second vehicle if the analyzed data indicates that the first vehicle is approaching the second vehicle at a high rate of speed or preparing to change lanes in close proximity to the second vehicle. The automatic strobe light warning operates independently of a driver of the second vehicle. The program instructions can further comprise: program instructions to vary the intensity of the automatic strobe signal when a driver of the second vehicle depresses the brake pedal of the second vehicle and program instructions to vary the intensity of the automatic strobe light signal when the first vehicle approaches the second vehicle at an increased rate of speed and at a shorter distance. The program instructions can further comprise: program instructions to issue an additional warning with the automatic strobe light signal, the additional warning comprising at least one of actuating a horn of the second vehicle, controlling a brake of the second vehicle, controlling a steering of the second vehicle, and adjusting a speed of the second vehicle.

A computer-usable tangible storage device storing computer program code is disclosed, the computer program code comprising program instructions executable by a processor, the program instructions comprising: program instructions to collect vehicle data for a first vehicle approaching a second vehicle, the vehicle data can comprise at least one distance of said first vehicle from said second vehicle, velocity of said first vehicle, deceleration of said first vehicle, velocity of said second vehicle, and deceleration of said second vehicle; program instructions to analyze the vehicle data to determine if the first vehicle can stop before colliding with the second vehicle; and program instructions to issue an automatic strobe light warning of varying intensity to alert a driver of the first vehicle if the analyzed data indicates that the first vehicle is approaching the second vehicle at a high rate of speed. The program instructions can further comprise: program instructions to sense the first vehicle approaching a slowed or stopped second vehicle via a rear vehicle sensor associated with the second vehicle.

The program instructions can further comprise: program instructions to activate the automatic strobe light warning and an automatic reactive system to control operation of the second vehicle if the analyzed data indicates that the first vehicle is approaching the second vehicle at a high rate of speed or preparing to change lanes in close proximity to the second vehicle. The program instructions can further comprise: program instructions to vary the intensity of the automatic strobe signal when a driver of the second vehicle depresses the brake pedal of the second vehicle; program instructions to vary the intensity of the automatic strobe light signal when the first vehicle approaches the second vehicle at an increased rate of speed and at a shorter distance; and program instructions to vary the intensity of the onboard driver warning system to indicate rear approaching vehicles.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
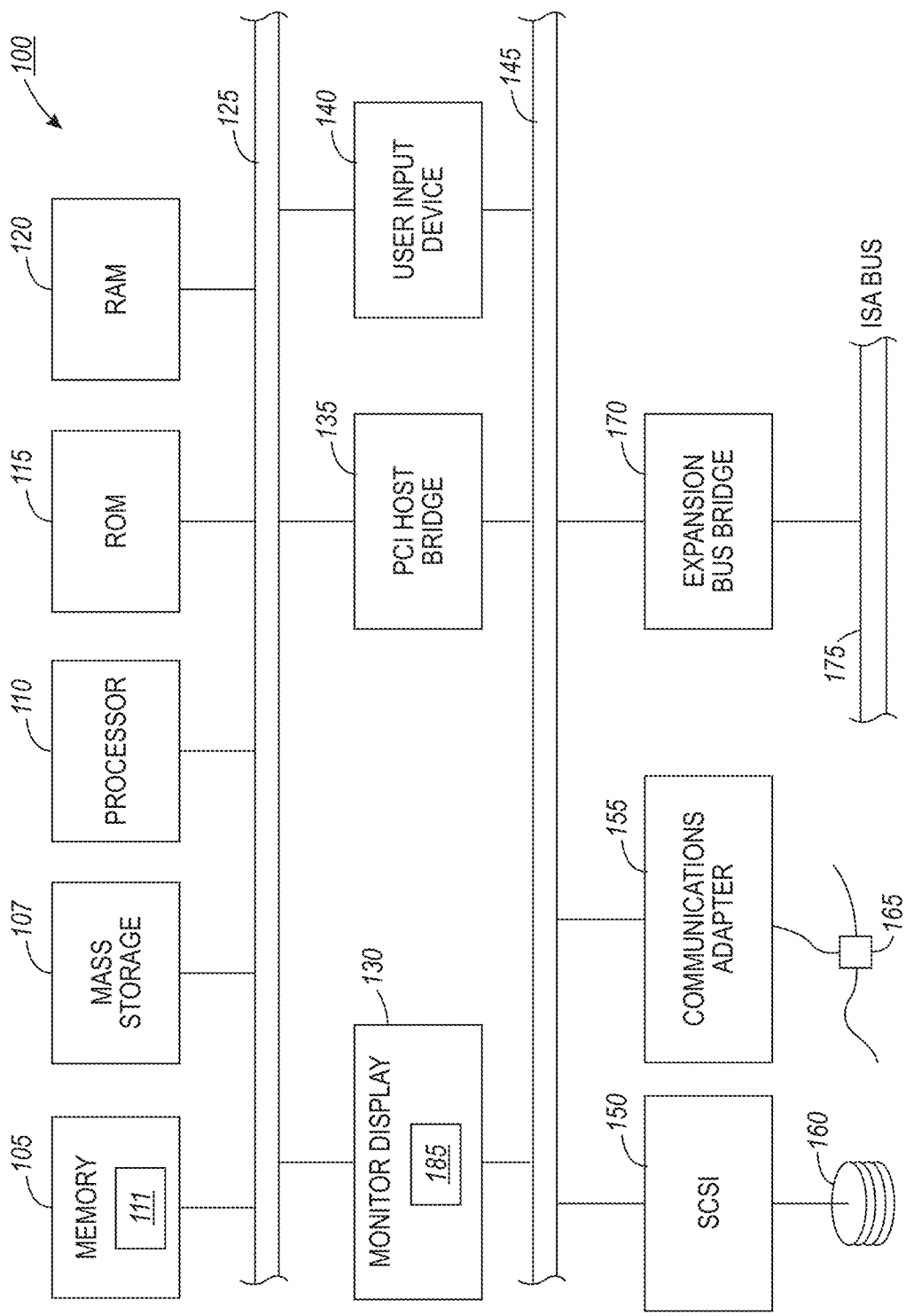
FIG. 1 illustrates an exemplary data-processing apparatus, which can be utilized in accordance with the disclosed embodiments.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one skilled in the art, one or more of the disclosed embodiments can be embodied as a method, system, or computer program usable medium or computer program product. Accordingly, the disclosed embodiments can in some instances take the form of an entire hardware embodiment, an entire software embodiment or an embodiment combining software and hardware aspects all generally referred to herein as a "module". Furthermore, the disclosed embodiments may take the form of a computer usable medium, computer program product, a computer-readable tangible storage device storing computer program code, the computer program code comprising program instructions executable by the processor on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages such as the "C" programming language or in a programming environment such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The disclosed embodiments are described in part below with reference to flowchart illustrations and/or block diagrams of methods, systems, computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks, FIG. 1 illustrates a block diagram of a sample data-processing apparatus 100, which can be utilized for an improved vehicle collision alert method and system. Data-processing apparatus 100 represents one of many possible data-processing and/or computing devices, which can be utilized in accordance with the disclosed embodiments. It can be appreciated that data-processing apparatus 100 and its components are presented for generally illustrative purposes only and do not constitute limiting features of the disclosed embodiments.

As depicted in FIG. 1, a memory 105, a mass storage 107 (e.g., hard disk), a processor (CPU) 110, a Read-Only Memory (ROM) 115, and a Random-Access Memory (RAM) 120 are generally connected to a system bus 125 of data-processing apparatus 100. Memory 105 can be implemented as a ROM, RAM, a combination thereof, or simply a general memory unit. Module 111 includes a software module in the form of routines and/or subroutines for carrying out features of the present invention and can be additionally stored within memory 105 and then retrieved and processed via processor 110 to perform a particular task. A user input device 140, such as a keyboard, mouse, or another pointing device, can be connected to PCI (Peripheral Component Interconnect) bus 145. Note that the term "GUI" generally refers to a type of environment that represents programs, files, options, and so forth by means of graphically displayed icons, menus, and dialog boxes on a computer monitor screen.

Data-process apparatus 100 can thus include CPU 110, ROM 115, and RAM 120, which are also coupled to a PCI (Peripheral Component Interconnect) local bus 145 of data-processing apparatus 100 through PCI Host Bridge 135. The PCI Host Bridge 135 can provide a low latency path through which processor 110 may directly access PCI devices mapped anywhere within bus memory and/or input/output (I/O) address spaces. PCI Host Bridge 135 can also provide a high bandwidth path for allowing PCI devices to directly access RAM 120.

A communications adapter 155, a small computer system interface (SCSI) 150, and an expansion bus-bridge 170 can also be attached to PCI local bus 145. The communications adapter 155 can be utilized for connecting data-processing apparatus 100 to a network 165. SCSI 150 can be utilized to control high-speed SCSI disk drive 160. An expansion bus-bridge 170, such as a PCI-to-ISA bus bridge, may be utilized for coupling ISA bus 175 to PCI local bus 145. Note that PCI local bus 145 can further be connected to a monitor 130, which functions as a display (e.g., a video monitor) for displaying data and information for a user and also for interactively displaying a graphical user interface (GUI).

Figure 2:
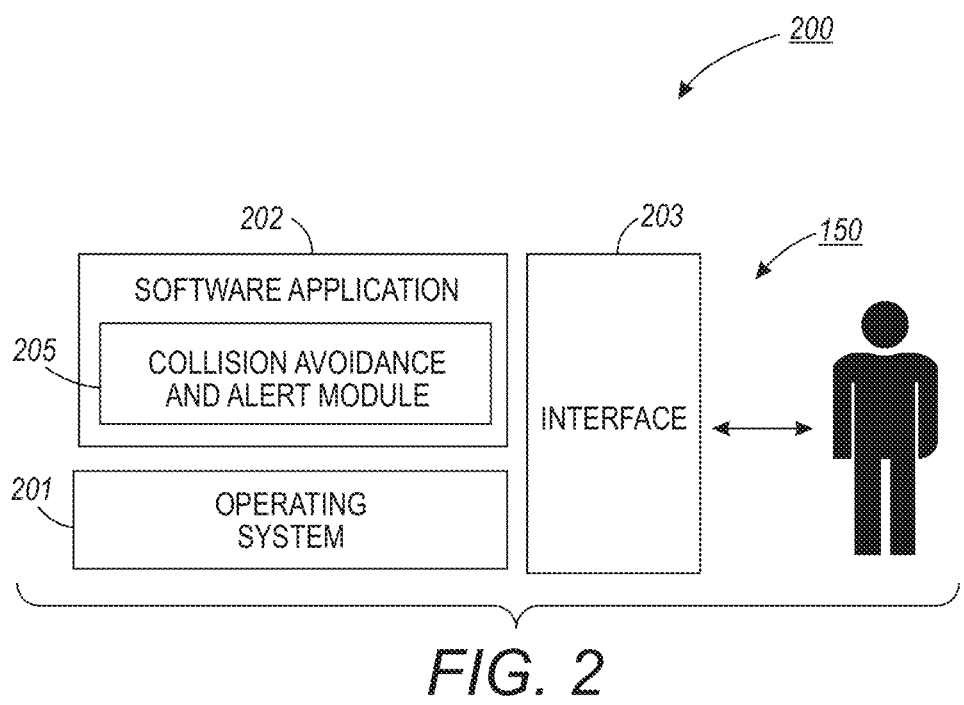
FIG. 2 illustrates an exemplary schematic view of a software system including an operating system, application software, and a user interface for carrying out the disclosed embodiments, in accordance with the disclosed embodiments.

FIG. 2 illustrates a schematic view of a software system 200 including an operating system, application software, and a user interface for carrying out the disclosed embodiments. Computer software system 200 directs the operation of the data-processing system 100 depicted in FIG. 1. Software application 202, stored in main memory 105 and on mass storage 107, includes a kernel or operating system 201 and a shell or interface 203. One or more application programs, such as software application 202, may be "loaded" (i.e., transferred from mass storage 107 into the main memory 102) for execution by the data-processing system 100. The data-processing system 100 receives user commands and data through the interface 203, as shown in FIG. 2. The user's command input may then be acted upon by the data-processing system 100 in accordance with instructions from operating system 201 and/or application module 202.

In an embodiment, operating system 201 and interface 203 can be implemented in the context of a "Windows" system. It can be appreciated, of course, that other types of systems are possible. For example, rather than a traditional "Windows" system, other operation systems such as, for example, Linux may also be employed with respect to operating system 201 and interface 203. The software application 202 can include a collision avoidance and alert module 205 that can be adapted to accurately predict the remaining useful life of a device or device component, as described in greater detail herein. The software application 202 can also be configured to communicate with the interface 203 and various components and other modules and features as described herein. The collision avoidance and alert module 205, in particular, can implement instructions for carrying out, for example, the embodiments depicted in FIGS. 3, 4, and 5, respectively, as described below, and/or additional operations as described herein.

The embodiments described herein can be implemented in the context of a host operating system and one or more modules. Generally, program modules include routines, programs, objects, components, data structures, etc., that perform particular tasks or implement particular abstract data types. Moreover, those skilled in the art will appreciate that the disclosed method and system may be practiced with other computer system configurations such as, for example, handheld devices, multi-processor systems, microprocessor-based or programmable consumer electronics, networked PCs, minicomputers, mainframe computers, and the like.

Software modules generally can include instruction media storable within a memory location of an image processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term "module" as utilized herein can therefore generally refer to software modules or implementations thereof. Such modules can be utilized separately or together to form a program product that can be implemented when storing computer-readable instructions in a computer-usable tangible data storage device. An example of such a module that can embody features of the present invention is a collision avoidance and alert module 205, depicted in FIG. 2.

Figure 3:
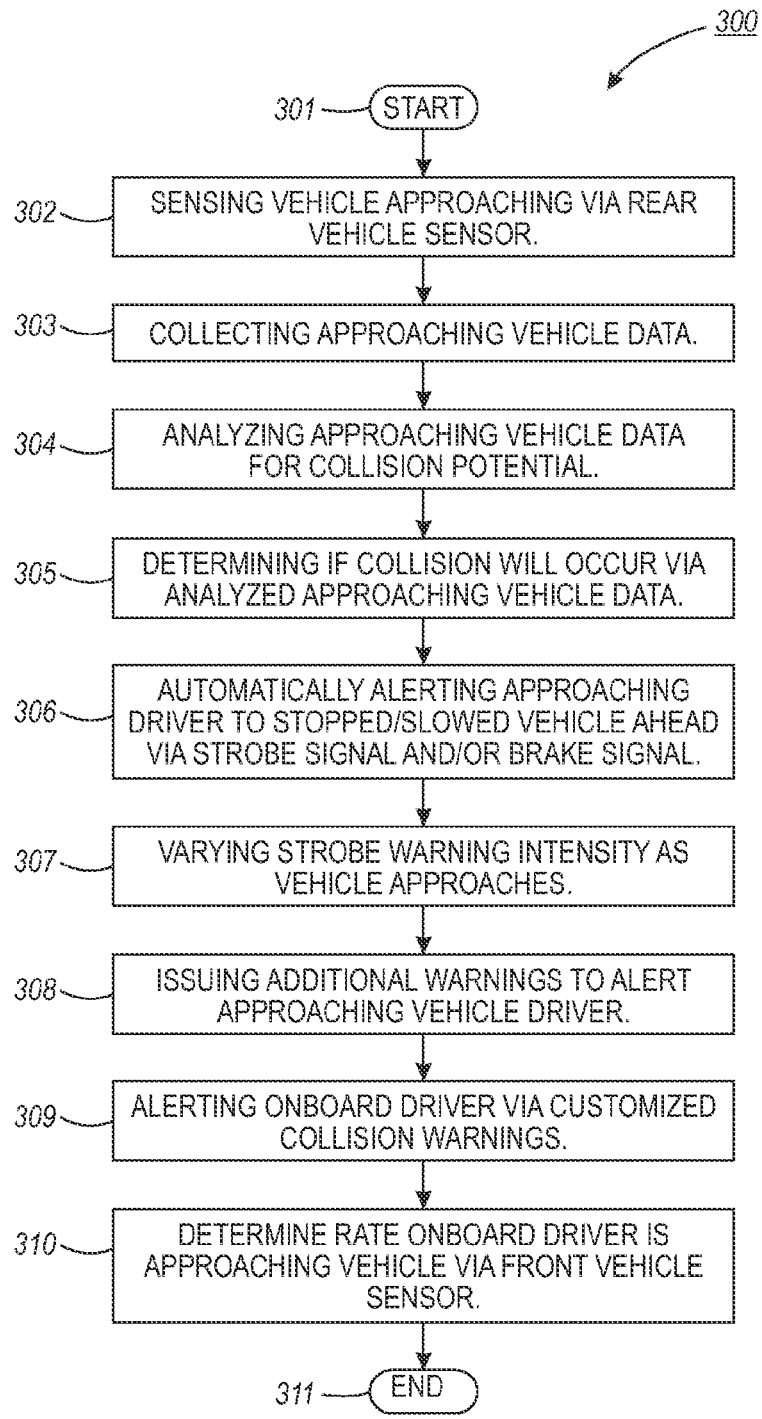
FIG. 3 illustrates an exemplary flow chart of vehicle collision avoidance signaling, in accordance with the disclosed embodiments.

FIG. 3 illustrates an exemplary flow chart 300 of vehicle collision avoidance signaling, in accordance with the disclosed embodiments. The vehicle collision avoidance signal captures the attention of a distracted driver to allow the driver to react and brake appropriately before colliding with another vehicle. The collision signaling process is initiated, as illustrated in block 301, when an approaching vehicle encroaches a safety zone behind a stopped or slowed vehicle. That is, when a vehicle approaches the stopped or slowed vehicle too quickly to stop before colliding. Rear vehicle sensors can sense vehicles approaching from the rear, or from the rear or side during a lane change, as illustrated in block 302. The sensors collect information regarding the distance, velocity, and the deceleration of the approaching vehicle, as illustrated in block 303. An associated processor 110 analyzes data collected by the sensor to determine whether a collision is about to occur, as illustrated in block 304. The processor 110 determines whether the potential collision requires activation of a reactive system to control operation of the onboard vehicle as the processor 110 integrates with the onboard vehicle's speedometer signal and braking system, as illustrated in block 305. If the approaching vehicle is traveling at a slow enough speed and or at a far off distance, no warning would be issued, and the process ends, as illustrated in block 311.

If a driver is approaching a stopped or slowed vehicle at a high rate of speed, prepares to change lanes with a vehicle in close proximity, or makes a steering move to change lanes, the system automatically alerts the approaching driver regarding the stopped vehicle via a strobe or flashing lighting system, as illustrated in block 306. The intensity of the strobe signal can vary according to the sensed collision danger level (e.g., a vehicle quickly approaching will be shown progressively brighter or faster strobe signals to get the driver's attention). The strobe warning light disclosed herein functions independently of the onboard driver of the vehicle. Therefore, its operation is not affected by an onboard driver's attentiveness, judgment, or reaction time.

A braking signal would be indicated and a momentary brake signal would be given without the driver of the on board system touching the brakes. When the driver depresses the brakes, the intensity of strobe signal changes based on how hard the driver is braking and depending on the rate and distance at which a vehicle is approaching (e.g., faster strobe signal when the driver presses the brakes harder and/or vehicle approaching faster), as illustrated in block 307. For example, the strobe warning signal can be included proximate to the rear, center brake light, either around, below, above, to the left, or to the right, or in more than one location. The strobe warning signal can also be integral to the housing of the rear, or center brake lights.

Additional warnings can accompany the strobe signal such as, for example, actuating a horn of the vehicle, controlling a brake of the vehicle, controlling a steering of the vehicle, or adjusting a speed of the vehicle, as illustrated in block 308. Optionally, the signals can be customized based on driver comfort level such as, for example, setting a strobe warning to be delivered when a car is approaching at a certain speed or at a certain distance, as illustrated in block 309.

The embodiments can also include a front sensor to determine the rate at which the onboard driver is approaching a vehicle, as illustrated in block 310. If the system determines that the onboard driver is approaching the vehicle too quickly, a warning signal would be given without the onboard driver touching the brakes such as, for example, a warning light and warning buzzer mounted internally to the onboard vehicle. The warnings can alert the driver of the onboard vehicle of potentially hazardous speed changes of vehicles ahead or vehicles quickly approaching from behind. The collision signaling process ends when an approaching vehicle stops before colliding with the onboard vehicle, as illustrated in block 311.

Figure 4:
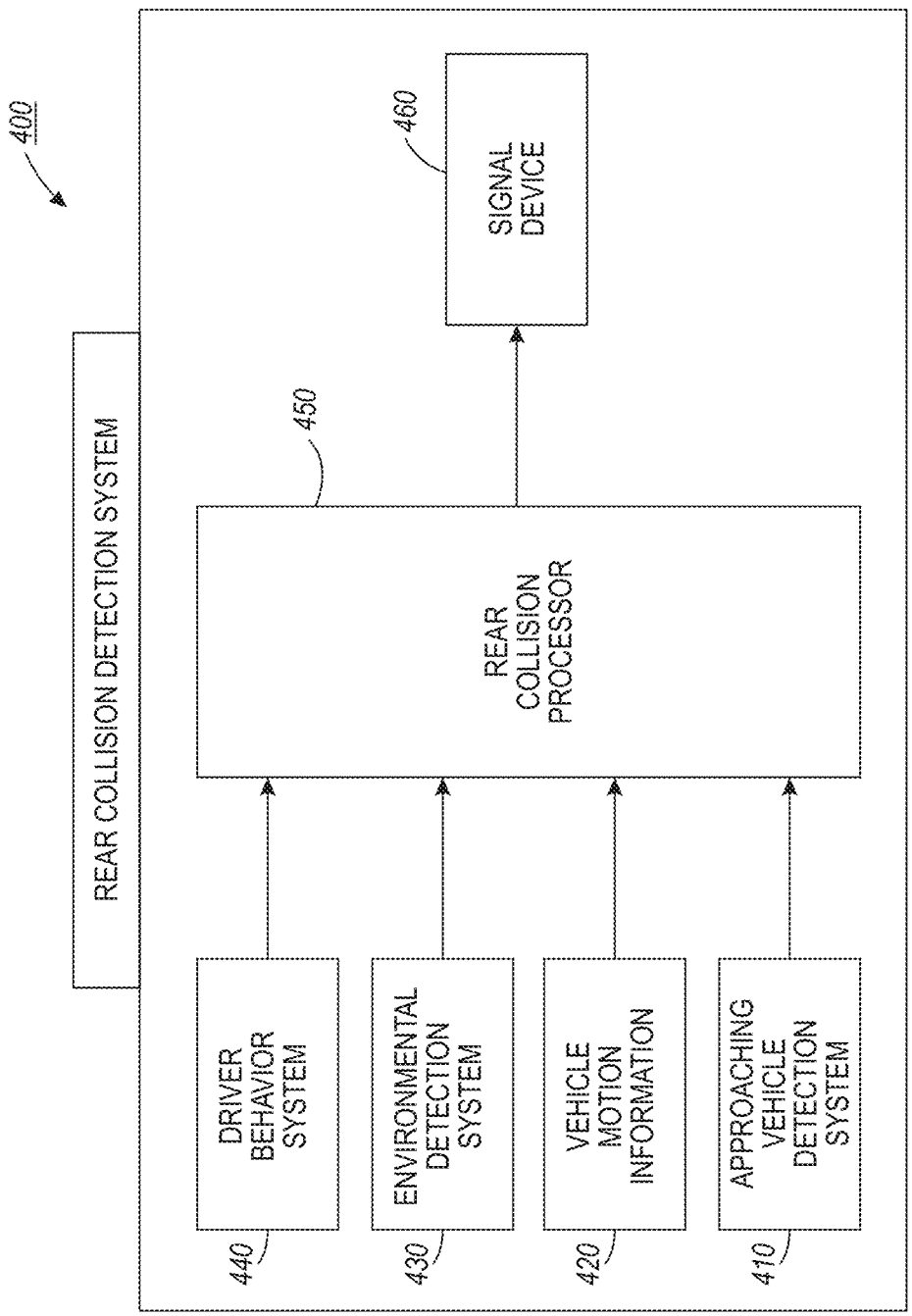
FIG. 4 illustrates an exemplary schematic diagram of a rear collision warning system, in accordance with the disclosed embodiments.

FIG. 4 illustrates an exemplary schematic diagram 400 of a rear collision warning system, in accordance with the disclosed embodiments. The warning system comprises: an approaching vehicle detection system 410, a vehicle motion information system 420, an environmental detection system 430, a driver behavior system 440, a rear collision processor 450, and a signal device 460.

The approaching vehicle detection system 410 determines the size and motion information of an approaching vehicle. Motion information could include distance, velocity, and acceleration. This information could be collected and processed using, for example, camera systems, ultra sonic sensors, laser sensors, micro wave sensors, etc. The vehicle motion information system 420 determines the motion information of the vehicle in which this system is installed (e.g. onboard vehicle). This information could be collected and processed using, for example, onboard vehicle computers, GPS signals, accelerometers, gyroscopes, etc. The environmental detection system 430 determines the environmental conditions that could affect braking. Sensors determine temperature and precipitation. This information could be collected and processed using, for example, the onboard computer that controls the car.

Figure 5:
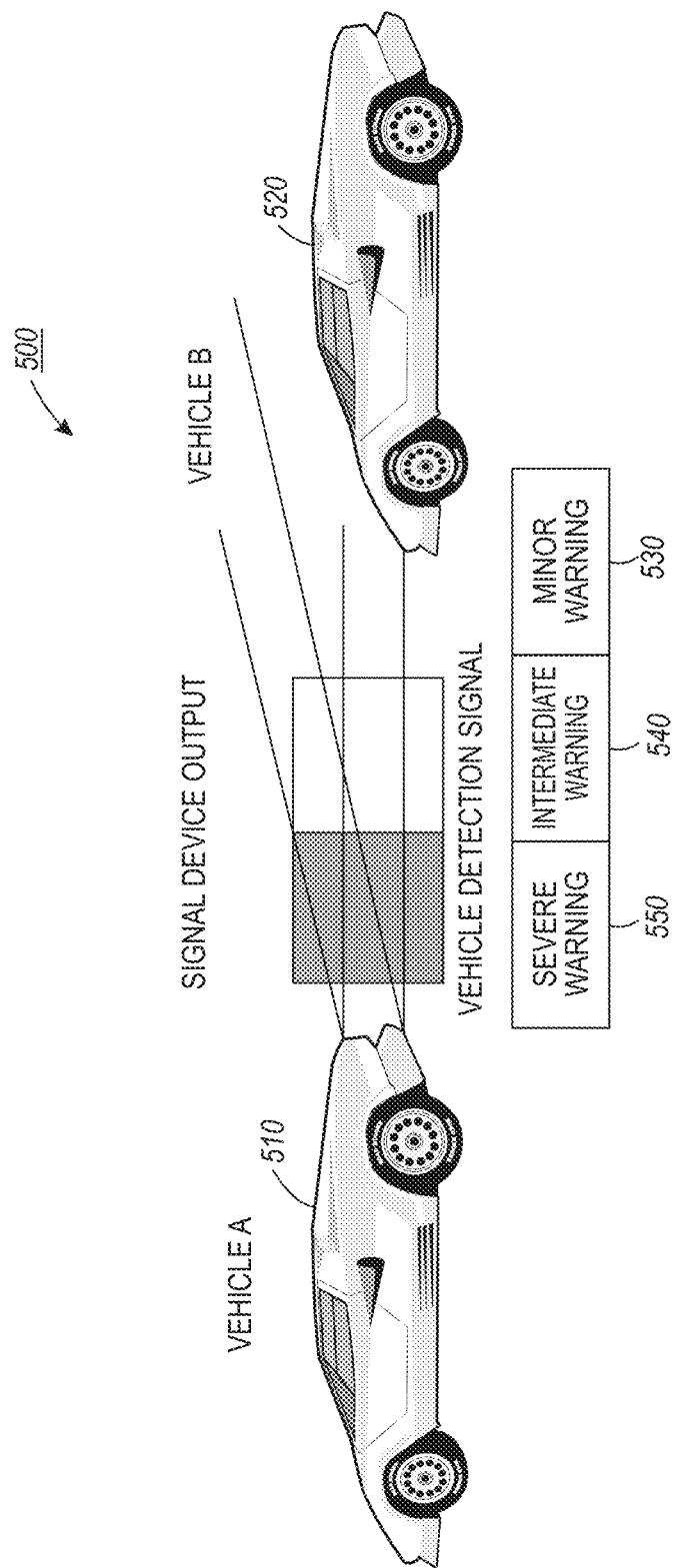
FIG. 5 illustrates an exemplary graphical illustration of collision warning levels, in accordance with the disclosed embodiments.

The driver behavior system 440 determines the current driver's driving behavior by monitoring the current driver's braking behavior, build, and expected braking behavior database. The rear collision processor 450 processes all the input information and provides an appropriate response output signal. The output response signal can range from no response output required to a severe response output delivered, as illustrated in FIG. 5. The output will be based on the input information and therefore a processor algorithm is required to perform this task. An exemplary collision processing Algorithm can comprise:

$$Dw=3*(Rt(Vb-Va))$$

wherein Dw=Distance to begin warning
Rt=Reaction Time of Driver (Typically 1.5 Seconds)
Va=Velocity of Front Vehicle
Vb=Velocity of Rear Vehicle The signaling device 460 can vary in wattage. Typically, the output would be greater than 50 watts. The signaling device 460 could be an independent device or integrated into the existing vehicle equipment. There could be a single or a multitude of devices 460 mounted on or within the vehicle. The signaling device 460 could have only one output or a multitude of output signals, each displayed in any array of colors. The signal device 460 can also include an internal signal for the onboard driver to warn the onboard driver to take diversionary actions to avoid a collision from the rear.

FIG. 5 illustrates an exemplary graphical illustration 500 of collision warning levels, in accordance with the disclosed embodiments. The intensity of the strobe signal can vary according to the sensed collision danger level (e.g., a vehicle quickly approaching will be shown progressively brighter or faster strobe signals to get the driver's attention). When the approaching vehicle's 520 distance is further from the stopped or slowed vehicle 510, then Dw no output would be required. When the approaching vehicle's 520 distance is equal to Dw, the first basic minor response 530 of brake light pulse is given every X seconds, until the vehicle separation distance is greater than Dw. When the vehicles' 510, 520 separation distance is less than Dw, the severity of the warning will increase to an intermediate warning 540, then to a severe warning 550, as the separation distance meets various thresholds.

There can be a multitude of thresholds and associated signaling for each warning, as illustrated in FIG. 5. The maximum signal for a severe warning 550 can be a strong strobe light signal at a pulse pattern that would draw maximum attention. The maximum signal 550 may come at a point when separation distance has become less than 50% of Dw. The exemplary algorithm can include environmental compensation, other vehicle motion information such as acceleration, size of approaching vehicle compensation, and perhaps driver behavior compensation. The detection of the approaching vehicle's location improves the reliability and effectiveness of this system and reduces false warnings.

Based on the foregoing, it can be appreciated that a variety of embodiments, preferred and alternative, are disclosed herein. For example, in one embodiment, a method can be implemented, comprising collecting vehicle data for a first vehicle approaching a second vehicle; analyzing the vehicle data to determine if the first vehicle can stop before colliding with the second vehicle; and issuing an automatic strobe light warning of varying intensity to alert a driver of the first vehicle if the analyzed data indicates that the first vehicle is approaching the second vehicle at a high rate of speed.

In another embodiment, an operation can be implemented for sensing the first vehicle approaching a slowed or stopped second vehicle via a rear vehicle sensor associated with the second vehicle. In yet another embodiment, the aforementioned vehicle data can comprise, for example, one or more of the distance of said first vehicle from said second vehicle, velocity of said first vehicle, deceleration of said first vehicle, velocity of said second vehicle, and deceleration of said second vehicle. In other embodiments, an operation can be provided for activating the automatic strobe light warning and an automatic reactive system to control operation of the second vehicle if the analyzed data indicates that the first vehicle is approaching the second vehicle at a high rate of speed or preparing to change lanes in close proximity to the second vehicle. In still other embodiments, the automatic strobe light warning can operate independently of the driver of the second vehicle.

In yet other embodiments, an operation can be provided for varying the intensity of the automatic strobe signal when a driver of the second vehicle depresses a brake pedal of the second vehicle. In still other embodiments, an operation can be implemented for varying an intensity of the automatic strobe light signal when the first vehicle approaches the second vehicle at an increased rate of speed and shorter distance. In other embodiments, an operation can be implemented for issuing an additional warning with the automatic strobe light signal, the additional warning comprising at least one of actuating a horn of the second vehicle, controlling a brake of the second vehicle, controlling a steering of the second vehicle, and adjusting a speed of the second vehicle.

In yet another embodiment, a system can be implemented, which includes, for example, a processor, a data bus coupled to the processor, and a computer-usable tangible storage device storing computer program code, the computer program code comprising program instructions executable by the processor. The aforementioned program instructions can include, for example, program instructions to collect vehicle data for a first vehicle approaching a second vehicle; program instructions to analyze the vehicle data to determine if the first vehicle can stop before colliding with the second vehicle; and program instructions to issue an automatic strobe light warning of varying intensity to alert a driver of the first vehicle if the analyzed data indicates that the first vehicle is approaching the second vehicle at a high rate of speed.

In other embodiments, such program instructions can include program instructions to sense the first vehicle approaching a slowed or stopped second vehicle via a rear vehicle sensor associated with the second vehicle. In still other embodiments of such a system, the aformentioned vehicle data can include one or more of the distance of said first vehicle from said second vehicle, velocity of said first vehicle, deceleration of said first vehicle, velocity of said second vehicle, and deceleration of said second vehicle. In other embodiments, the program instructions can include program instructions to activate the automatic strobe light warning and an automatic reactive system to control operation of the second vehicle if the analyzed data indicates that the first vehicle is approaching the second vehicle at a high rate of speed or preparing to change lanes in close proximity to the second vehicle. In still other embodiments, the aforementioned automatic strobe light warning, in the context of such a system, can operate independently of the driver of the second vehicle.

In other embodiments, such program instructions can further comprise program instructions to vary an intensity of the automatic strobe signal when a driver of the second vehicle depresses a brake pedal of the second vehicle. In still other embodiments, such program instructions can include program instructions to vary an intensity of the automatic strobe light signal when the first vehicle approaches the second vehicle at an increased rate of speed and shorter distance. In other embodiments, such program instructions can further include program instructions to issue an additional warning with the automatic strobe light signal, the additional warning comprising at least one of actuating a horn of the second vehicle, controlling a brake of the second vehicle, controlling a steering of the second vehicle, and adjusting a speed of the second vehicle.

In still another embodiment, a computer-usable tangible storage device storing computer program code can be implemented, wherein the computer program code includes program instructions executable by a processor. Such program instructions can include, for example, program instructions to collect vehicle data for a first vehicle approaching a second vehicle, the vehicle data comprises at least one of the distance of said first vehicle from said second vehicle, velocity of said first vehicle, deceleration of said first vehicle, velocity of said second vehicle, and deceleration of said second vehicle; program instructions to analyze the vehicle data to determine if the first vehicle can stop before colliding with the second vehicle; and program instructions to issue an automatic strobe light warning of varying intensity to alert a driver of the first vehicle if the analyzed data indicates that the first vehicle is approaching the second vehicle at a high rate of speed.

In other embodiments, such program instructions can further include instructions to sense the first vehicle approaching a slowed or stopped second vehicle via a rear vehicle sensor associated with the second vehicle. In yet other embodiments, such program instructions can include program instructions to activate the automatic strobe light warning and an automatic reactive system to control operation of the second vehicle if the analyzed data indicates that the first vehicle is approaching the second vehicle at a high rate of speed or preparing to change lanes in close proximity to the second vehicle. In still other embodiments, such program instructions can include instructions to vary an intensity of the automatic strobe signal when a driver of the second vehicle depresses a brake pedal of the second vehicle; program instructions to vary an intensity of the automatic strobe light signal when the first vehicle approaches the second vehicle at an increased rate of speed and shorter distance; and program instructions to vary an intensity of the onboard driver warning system to indicate rear approaching vehicles.

It will be appreciated that variations of the above-disclosed and other features and functions, or alternatives thereof, may be desirably combined into many other different systems or applications. Furthermore, various presently unforeseen or unanticipated alternatives, modifications, variations or improvements therein may be subsequently made by those skilled in the art which are also intended to be encompassed by the following claims.

The invention claimed is:

1. A method, comprising:
    collecting vehicle data for a first vehicle changing lanes towards a second vehicle or which makes a steering move to change lanes towards said second vehicle, wherein said vehicle data is collected via a sensor and processed via a processor integrated with an onboard speedometer and braking system of said second vehicle, said vehicle data including at least one of all of the following: a distance, a velocity and a deceleration;
    analyzing said vehicle data collected from said processor to determine via said processor if said first vehicle can stop or slow down before colliding with said second vehicle;
    activating an automatic reactive system that controls operation of said second vehicle and additional warnings if said analyzed data indicates that said first vehicle is approaching said second vehicle at said high rate of speed or preparing to change lanes in close proximity to said second vehicle; and;
    issuing an automatic strobe light warning from said second vehicle of varying intensity which varies according to a sensed collision danger level to alert a driver of said first vehicle if said analyzed data indicates that said first vehicle is approaching said second vehicle at a high rate of speed or in close proximity to said second vehicle, and how hard the brakes of said second vehicle are being pressed, wherein said automatic strobe light warning comprises an automatic strobe signal and wherein said varying intensity comprises a progressively brighter and faster automatic strobe signal to alert said driver of said first vehicle according to a sensed collision danger level, such that said automatic strobe light warning functions independently of a driver of said second vehicle and is not affected by a reaction time, judgment or an attentiveness of said driver of said first vehicle.

2. The method of dam 1, further comprising sensing said first vehicle approaching a slowed or stopped said second vehicle via a rear vehicle sensor associated with said second vehicle.

3. The method of dam 2, wherein said vehicle data comprises at least one of all of the following: a distance of said first vehicle from said second vehicle, a velocity of said first vehicle, a deceleration of said first vehicle, a velocity of said second vehicle, and a deceleration of said second vehicle.

4. The method of claim 1, further comprising:
    varying said intensity of said automatic strobe light signal when said first vehicle approaches said second vehicle at an increased rate of speed and a shorter distance.

5. The method of claim 1, further comprising:
    issuing an additional warning with said automatic strobe light signal, said additional warning comprising at least one of all of the following:
    actuating a horn of said second vehicle, controlling a brake of said second vehicle, controlling a steering of said second vehicle, and adjusting a speed of said second vehicle.

6. A rear collision warning system, comprising:
    a rear collision processor and at least one sensor, wherein said rear collision processor communicates electronically with said at least one sensor;
    a data bus coupled to said rear collision processor; and
    a non-transitory computer-usable tangible storage device storing computer program code, said computer program code comprising program instructions executable by said rear collision processor, said program instructions comprising:
    program instructions to collect vehicle data from said at least one sensor for a first vehicle changing lanes towards a second vehicle or makes a steering move to change lanes towards said second vehicle, wherein said vehicle data is collected via said rear collision processor integrated with an onboard speedometer and braking system of said second vehicle, said vehicle data including at least one of all of the following: a distance, a velocity and a deceleration of said first vehicle with respect to said second vehicle;
    program instructions to analyze said vehicle data obtained from said at least one sensor to determine if said first vehicle can stop or slow down before colliding with said second vehicle;
    program instructions to activate an automatic reactive system that controls operation of said second vehicle and additional warnings if said analyzed data indicates that said first vehicle is approaching said second vehicle at said high rate of speed or preparing to change lanes in close proximity to said second vehicle; and program instructions to issue an automatic strobe light warning from said second vehicle of varying intensity to alert a driver of said first vehicle if said analyzed data indicates that said first vehicle is approaching said second vehicle at a high rate of speed or in close proximity to said second vehicle, and how hard the brakes of said second vehicle are being pressed, wherein said automatic strobe light warning comprises an automatic strobe signal and wherein said varying intensity comprises a progressively brighter and faster strobe signal to alert said driver of first vehicle with a sensed collision danger level, such that said automatic strobe light warning functions independently of a driver of said second vehicle and is not affected by a reaction time, a judgment or an attentiveness of said driver of first vehicle.

7. The system of claim 6, wherein said program instructions further comprise:

program instructions to sense via said at least one sensor, said first vehicle approaching a slowed or stopped said second vehicle via a rear vehicle sensor associated with said second vehicle.

8. The system of claim 7, wherein said vehicle data comprises at least one of all of the following: a distance of said first vehicle from said second vehicle, a velocity of said first vehicle, a deceleration of said first vehicle, a velocity of said second vehicle, and a deceleration of said second vehicle.

9. The system of claim 6, wherein said program instructions further comprise:

program instructions to vary said intensity of said automatic strobe light signal when said first vehicle approaches said second vehicle at an increased rate of speed and shorter distance.

10. The system of claim 6, wherein said program instructions further comprise:

program instructions to issue an additional warning with said automatic strobe light signal, said additional warning comprising at least one of all of the following: actuating a horn of said second vehicle, controlling a brake of said second vehicle, controlling a steering of said second vehicle, and adjusting a speed of said second vehicle.

11. A rear collision warning system, comprising:

a rear collision processor that communicates electronically with and provides data to at least one signaling device;

a driver behavior system that communicates with said rear collision processor and determines a current driving behavior of a vehicle by monitoring a current driving behavior of said vehicle and building an expected braking behavior database;

an environmental detection system that communicates with said rear collision processor and which determines environmental conditions affecting braking of said vehicle;

a vehicle motion information system that communicates with said rear collision processor and determines motion information of said vehicle;

an approaching vehicle detection system that communicates with said rear collision processor to determine size information and motion information of an approaching vehicle, said motion information including at least one of all of the following types of data: distance, velocity and acceleration;

wherein said rear collision processor processes information provided as input to said rear collision processor from said driver behavior system, said environmental detection system, said vehicle information system and said approaching vehicle detection system to provide a response output signal via said at least one signaling device.

12. The system of claim 11 wherein said motion information determined by said vehicle motion information is collected and processed via at least one of all of the following: an onboard vehicle computer associated with said vehicle, a GPS device, an accelerometer and a gyroscope.

13. The method of claim 11 wherein said rear collision processor processes said information provided as input to said rear collision processor based on the following formulation: $Dw=3*(Rt(Vb-Va))$, wherein Dw=Distance to begin warning; Rt=Reaction Time of Driver; Va=Velocity of Front Vehicle; and Vb=Velocity of Rear Vehicle.

14. The system of claim 13 wherein an intensity of said response output signal via said at least one signaling device varies according to a sensed danger level.

* * * * *